(12) United States Patent
Hinz et al.

(10) Patent No.: US 9,484,146 B2
(45) Date of Patent: Nov. 1, 2016

(54) HIGH VOLTAGE TRANSFORMER HAVING A SENSOR SYSTEM, METHOD FOR MONITORING PHYSICAL CHARACTERISTIC VARIABLES OF A HIGH VOLTAGE TRANSFORMER AND SENSOR SYSTEM FOR MONITORING PHYSICAL CHARACTERISTIC VARIABLES

(71) Applicant: Maschinenfabrik Reinhausen GmbH, Regensburg (DE)

(72) Inventors: Ansgar Hinz, Leichlingen (DE); Frank Micksch, Oberursel (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 14/427,354

(22) PCT Filed: Sep. 19, 2013

(86) PCT No.: PCT/EP2013/069449
§ 371 (c)(1),
(2) Date: Mar. 11, 2015

(87) PCT Pub. No.: WO2014/056696
PCT Pub. Date: Apr. 17, 2014

(65) Prior Publication Data
US 2015/0235759 A1   Aug. 20, 2015

(30) Foreign Application Priority Data
Oct. 10, 2012   (DE) .................. 10 2012 109 640

(51) Int. Cl.
*G02B 6/00* (2006.01)
*H01F 27/40* (2006.01)
(Continued)

(52) U.S. Cl.
CPC .......... *H01F 27/402* (2013.01); *G01M 11/085* (2013.01); *H01F 29/00* (2013.01); *H01F 2027/406* (2013.01)

(58) Field of Classification Search
None
See application file for complete search history.

(56) References Cited

U.S. PATENT DOCUMENTS

| 5,680,489 A | 10/1997 | Kersey |
| 6,137,565 A | 10/2000 | Ecke |

(Continued)

FOREIGN PATENT DOCUMENTS

| CN | 201892586 U | 7/2011 |
| CN | 102589747 A | 7/2012 |

(Continued)

OTHER PUBLICATIONS

Joerg Teunissen,Ralf Merte,Dirk Peier,Stability of Fiber Bragg Grating Sensors for Integration Into High-Voltage Transformers for Online Monitoring,University of Dortmund, Institute of High Voltage Engineering, 0-7803-7289-1/02/$17,00@2002 IEEE.

(Continued)

*Primary Examiner* — Sung Pak
(74) *Attorney, Agent, or Firm* — Andrew Wilford

(57) ABSTRACT

The invention relates to a high voltage transformer (6) having a sensor system (30) for monitoring physical characteristic variables. In particular, said sensor system has at least one sensor (1) that comprises a glass fiber (3) with a sensor head (2). Said sensor head supports a plurality of Bragg gratings (7, 8, 9). An evaluation unit (10) is associated with the sensor system and is connected to the at least one sensor head via said glass fiber. The invention is based on the general inventive concept of arranging the sensors of the sensor system between successive windings (4, 5) of the high voltage transformer using spacers. In addition, the use of a plurality of Bragg gratings in the sensor head ensures that at least one of the Bragg gratings determines the actual physical characteristic variables such as temperature or contact force (A).

9 Claims, 2 Drawing Sheets

(51) Int. Cl.
*G01M 11/08* (2006.01)
*H01F 29/00* (2006.01)

(56) References Cited

U.S. PATENT DOCUMENTS

| | | |
|---|---|---|
| 6,587,188 B2 | 7/2003 | Gleine |
| 6,822,218 B2 | 11/2004 | Helmig |
| 6,847,745 B2 | 1/2005 | Bosselmann |
| 7,174,075 B2 | 2/2007 | Drubel et al. |
| 7,327,909 B2 | 2/2008 | Marceau |
| 2014/0092938 A1 | 4/2014 | Adolf |
| 2014/0321799 A1* | 10/2014 | Udd .................. G01L 1/246 385/13 |

FOREIGN PATENT DOCUMENTS

| | | |
|---|---|---|
| DE | 19507941 A | 9/1995 |
| EP | 1947418 A | 7/2008 |

OTHER PUBLICATIONS

Teunissen, Joerg et al "Stability of Fiber Bragg Grating Sensors . . . " Univ. of Dortmund; Date unknown.

* cited by examiner

HIGH VOLTAGE TRANSFORMER HAVING A SENSOR SYSTEM, METHOD FOR MONITORING PHYSICAL CHARACTERISTIC VARIABLES OF A HIGH VOLTAGE TRANSFORMER AND SENSOR SYSTEM FOR MONITORING PHYSICAL CHARACTERISTIC VARIABLES

CROSS REFERENCE TO RELATED APPLICATIONS

This application is the US-national stage of PCT application PCT/EP2013/069449 filed 19 Sep. 2013 and claiming the priority of German patent application 102012109640.6 itself filed 10 Oct. 2012.

FIELD OF THE INVENTION

The invention relates to a high-voltage transformer with a sensor system for monitoring physical characteristic variables. In particular, the sensor system comprises at least one sensor that comprises an optical fiber with a sensor head. The sensor head carries a plurality of Bragg gratings. An evaluating unit connected with the at least one sensor head by the optical fiber is associated with the sensor system.

The invention additionally relates to a method of monitoring physical characteristic variables of a high-voltage transformer.

Moreover, the invention relates to a sensor system for monitoring physical characteristic variables of a high-voltage transformer.

The use of fiber-optical Bragg gratings for temperature measurement is known from the publication Helmig, C.; Peier, D.: "Alternative Technologien zur Messung wichtiger Betriebskenngrössen in Energienetzen," Elektrie, Berlin 53 (1999) A, special issue 9/99, page 342 et seq. In that regard, the region of periodically arranged layers of different refractive indices in the core structure of a monomode optical waveguide is termed fiber Bragg grating. This region is generated in production by exposing the fiber to sufficiently shortwave ultraviolet light by an exposure mask. The photosensitivity of the fiber core consisting of $GeO_2$-doped quartz glass enables change of the effective refractive index $n_{eff}$ of the optical medium at the exposure locations that are arranged strictly periodically, at the spacing $l_{BG}$. This is explained in detail in the publication Bludau, W.: 'Lichtwellenleiter in Sensorik and optischer Nachrichtentechnik', Springer Verlag Berlin Heidelberg New York, (VDI-Buch), 1998. Light propagation in the fiber core is influenced by change in the core structure of the optical fiber. An incident wide-band light spectrum experiences dispersion at the structure of the fiber Bragg grating due to the modulation that is produced, of the effective refracted index. For a specific wavelength of the light conducted in the monomode optical waveguide, the reflected light source is again in phase and superimposed. Fiber Bragg gratings therefore act like a wavelength-selective mirror.

By virtue of their characteristic geometry, fiber Bragg gratings thus have wavelength-selective behavior. Each Bragg wavelength reflects in a respective narrow band. Since this property is sensitive to external influencing variables, such as temperature or expansion of the grating, fiber Bragg gratings can be used for sensor applications, particularly also for temperature detection. In that case, signal evaluation is restricted to very precise wavelength detection in the nanometer range. The Bragg reflection wavelength is then directly dependent on the optical fiber temperature and thus the temperature in the environment of the optical fiber, for example in electrical equipment.

It has already been proposed to provide several fiber Bragg gratings acting independently of one another in one optical fiber. This is possible, since due to the small shift of the Bragg reflection wavelength in the case of temperature variation in the measurement range of interest when using a wide-band light source it is possible to identify the different Bragg gratings. Bragg gratings can thus be inscribed at different positions in an optical fiber and thereby placed at different locations in electrical equipment. The individual Bragg gratings in that case have a different specific Bragg reflection wavelength $l_{BG}$, whereby a defined association of an ascertained temperature with the respective measurement location in the electrical equipment is ensured.

The linear dependence of the reflection wavelength on optical fiber temperature can be detected in terms of measurement by detection of the respective prevailing wavelength in the case of temperature variation with the help of a commercial optical spectrum analyzer, for example of the types HP 71450B, 7125B, 71452B and 86140A of the manufacturer Hewlett Packard or an instrument from the series 'WA' of 'Burleigh'. Disadvantages with regard to use in the field of fiber-optical temperature measurement are the high capital costs connected with these wavelength detection methods and corresponding apparatus for the measuring instruments and the thus over-dimensioned design, which is closely connected therewith, of the instruments that would not be required for the wavelength detection described here.

Moreover, an arrangement for determining temperature and expansion of an optical fiber is already known from DE 198 21 616 A1 [U.S. Pat. No. 6,137,565], which arrangement consists of a wide-band light source, a fiber coupler for coupling-in of the light of the light source into an optical fiber with one or more fiber Bragg gratings and for coupling-out the light, which is reflected at the fiber Bragg gratings, into a further optical fiber, as well as an evaluating device for evaluation of the optical signal coupled into this second optical fiber. In that case, this evaluating device, with which the second optical fiber is connected, for its part consists of an interferometer arrangement that comprises an optical input, two optical dividers for dividing the light into two optical paths, means for generating two interferometer arms with different optical path lengths and at least one phase modulator at one of the interferometer arms. The interferometer arrangement thus supplies two optical outputs that are respectively subjected to spectral resolution in a downstream spectral analyzer as a light beam entering there and are subsequently guided to two separate receiver arrangements. This known arrangement, which similarly requires a special spectral analyzer, is also expensive, complicated and essentially over-dimensioned for pure wavelength detection in the instance of temperature detection by means of a Bragg grating.

Moreover, a method and device for wavelength detection in the case of temperature detecting by means of an optical fiber are known from EP 1 178 295 A1 [U.S. Pat. No. 6,822,218]. In that case the device consists of a first optical fiber that has an inscribed Bragg grating. The sensor, in particular the measurement point with the Bragg grating, is arranged at operating means having a temperature that is to be determined. In addition, the device comprises a second optical fiber, in which a Bragg grating is similarly inscribed. This second optical fiber connects a light source with a photodetector. The two optical fibers are connected together by an optocoupler. In the case of temperature measurement, the specific wavelengths of the two Bragg gratings impinge on one another in the optocoupler. Through change of the wavelength of the first Bragg grating, then due to the changing temperature a part of the wavelength is reflected when the impinging occurs. The non-reflected part is passed on by the second optical fiber to the photodetector. A temperature change is then ascertained on the basis of the reflected part.

A particularly significant disadvantage of the arrangement known from the prior art is the inaccuracy of the measurement. Since the sensors have only one measurement point and are used for determining the winding temperature in high-voltage transformers it is necessary to fasten these as precisely as possible to a winding. This is not simple, since the copper lines of a transformer are usually wrapped by oil-saturated paper and surrounded by insulating oil. The positioning of the sensors is carried out at the time of manufacture of the transformers, thus during winding of the coils. Here it is a very frequent occurrence that the sensors slip, thereby lose contact with the windings and thus measure the temperature of the insulating oil and not of the windings. The actual temperature of the windings can be up to 15 Kelvin higher than that of the surrounding insulating oil.

OBJECT OF THE INVENTION

It is an object of the invention to provide a high-voltage transformer with a sensor system for monitoring physical characteristic variables of a high-voltage transformer that is of simple construction and reliable and performs accurate measurements of the physical characteristic variables.

Another object is to provide an improved method of monitoring physical characteristics of a high-voltage transformer with such a sensor system.

SUMMARY OF THE INVENTION

This object is fulfilled by a high-voltage transformer with a sensor system in which the at least one sensor is mechanically connected with a support between two successive windings of the high-voltage transformer.

The method object is attained by a method of monitoring physical characteristic variables of a high-voltage transformer with a sensor system that comprises the steps of radiating light with a defined wavelength spectrum into an optical fiber connected with a sensor head of a sensor;

determining a shift of the wavelength spectra of each Bragg grating in the sensor head of the at least one sensor and assigning to it a respective measured value;

comparing the measured values with one another and determining the maximum measured value;

deriving a temperature of two successive windings of the high-voltage transformer from the maximum measured value;

determining a Bragg wavelength $l_{max}$ of that Bragg grating with the maximum measured value;

comparing the Bragg wavelength $l_{max}$ with a mechanically unloaded Bragg wavelength $l_{unloaded}$ that serves as a standard value; and deriving a contact pressure by the difference between the Bragg wavelength $l_{max}$ and the mechanically unloaded Bragg wavelength $l_{unloaded}$.

An additional object of the invention is fulfilled by a sensor system for monitoring physical characteristic variables of a high-voltage transformer in which the sensor system comprises four sensors each with a respective sensor head, carrying a plurality of Bragg gratings, an evaluating unit is connected with each of the four sensors by a respective optical fiber and each sensor is mechanically connected with a support that is mounted between different successive windings of the high-voltage transformer.

The invention is based on the general inventive idea of arranging the sensors of the sensor system by means of spacers between successive windings of the high-voltage transformer. Moreover, with the help of a plurality of Bragg gratings in the sensor head at least one of the Bragg gratings determines the actual physical characteristic variables, such as temperature or contact pressing force.

The high-voltage transformer according to the invention is equipped with a sensor system for monitoring physical characteristic variables. The sensor system comprises at least one sensor that comprises an optical fiber with a sensor head. The sensor head is, for determining a temperature and the contact pressing force, constructed with a plurality of Bragg gratings. The Bragg gratings are mounted in the sensor head of the optical fiber by generally known methods. A predetermined wavelength spectrum is introduced into the optical fiber and thus into the sensor head. Associated with the sensor system is an evaluating unit that is connected with the at least one sensor head by the optical fiber and that receives and evaluates light returning from the Bragg gratings. For accurate and reproducible measurement, the at least one sensor is mechanically firmly connected with a support. The support is arranged, together with the sensor, between two successive windings of the high-voltage transformer and clamped in place therebetween.

Each sensor head has a first Bragg grating with a first characteristic Bragg wavelength $l_1$, a second Bragg grating with a second characteristic Bragg wavelength $l_2$ and a third Bragg grating with a third characteristic Bragg wavelength $l_3$. The Bragg gratings are arranged at a defined spacing from one another in the individual sensor heads. The spacing preferably lies in a range of more than 5 millimeters to less than 100 millimeters.

The sensor system according to the invention for monitoring physical characteristic variables of a high-voltage transformer is distinguished by the fact that the sensor system comprises four sensors each with a respective sensor head. Each sensor head carries a plurality of Bragg gratings. An evaluating unit is connected with each of the four sensors by a respective optical fiber. Each sensor is mechanically connected with a support, wherein each support is arranged between different successive windings of the high-voltage transformer.

According to a preferred form of embodiment the sensor system consists of four sensors that are each connected with the evaluating unit by an individual optical fiber. The four sensors are arranged at four different positions between two successive windings in the high-voltage transformer.

The physical characteristic variables to be measured are the temperature of two successive windings and/or a contact pressing force of two successive windings of the high-voltage transformer.

The method according to the invention for monitoring physical characteristic variables of a high-voltage transformer with a sensor system comprises the following steps:

light with a defined wavelength spectrum is radiated into an optical fiber connected with a sensor head of a sensor;

a shift of the wavelength spectra of each Bragg grating in the sensor head of the at least one sensor is determined and a respective measured value is assigned;

the measured values are compared with one another and the maximum measured value is determined;

a temperature of two successive windings of the high-voltage transformer is derived by the maximum measured value;

a Bragg wavelength $l_{max}$ of that Bragg grating with the maximum measured value is determined;

the Bragg wavelength $l_{max}$ is compared with a mechanically unloaded Bragg wavelength $l_{unloaded}$ that serves as standard value; and a contact pressure is derived by the difference between the Bragg wavelength $l_{max}$ and the mechanically unloaded Bragg wavelength $l_{unloaded}$.

BRIEF DESCRIPTION OF THE DRAWING

The invention and the advantages thereof are explained in more detail in the following by the accompanying figures. The size relationships in the figures do not always correspond with the actual size relationships, since some forms are simplified and other forms are, for the sake of better clarity, illustrated enlarged in relation to the other elements. In the drawing.

SPECIFIC DESCRIPTION OF THE INVENTION

Figure 1:
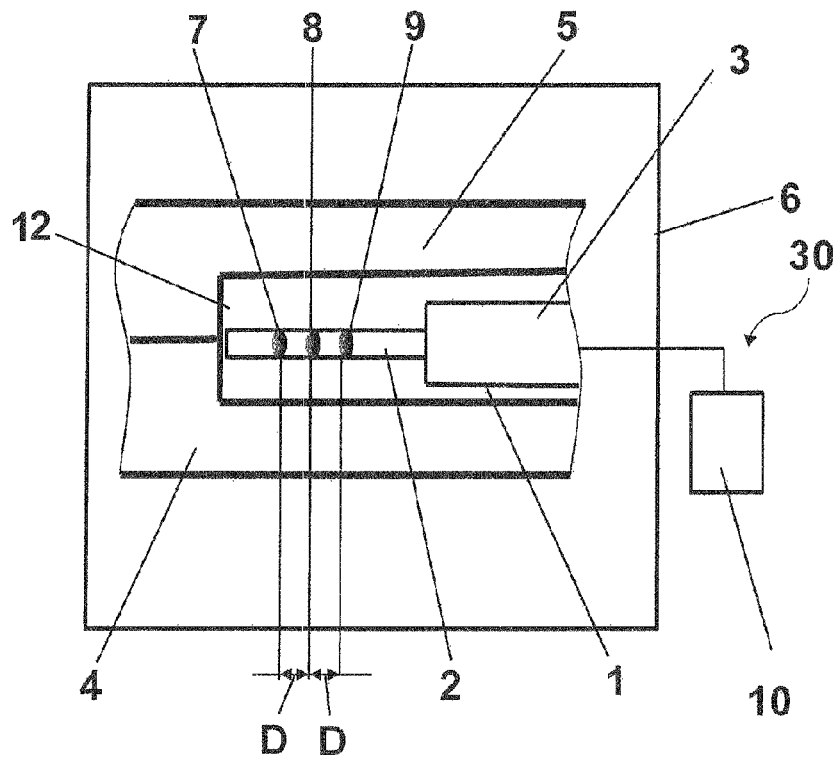
FIG. 1 shows a part of the high-voltage transformer according to the invention with a sensor system.

Identical reference numerals are used in the drawing for the same or equivalent elements of the invention. In addition, for the sake of clarity only reference numerals required for description of the respective figure are illustrated in the individual figures.

A high-voltage transformer 6 according to the invention with a sensor system 30 is depicted in FIG. 1. The sensor system 30 consists of at least one sensor 1 that consists of an optical fiber 3. The sensor 1 comprises a sensor head 2 and the optical fiber 3 that is surrounded by insulation. The sensor head 2 and a part of the optical fiber 3 are mounted on or embedded in a support 12. The support 12 ensures that the sensor 1, particularly the sensor head 2, when positioned between two successive windings 4 and 5 of the high-voltage transformer 6 is not buckled and thus also has secure and better contact with the windings 4 and 5. Moreover, the paddle shape of the sensor 1 ensures that the line is not kinked during the mounting.

Figure 2:
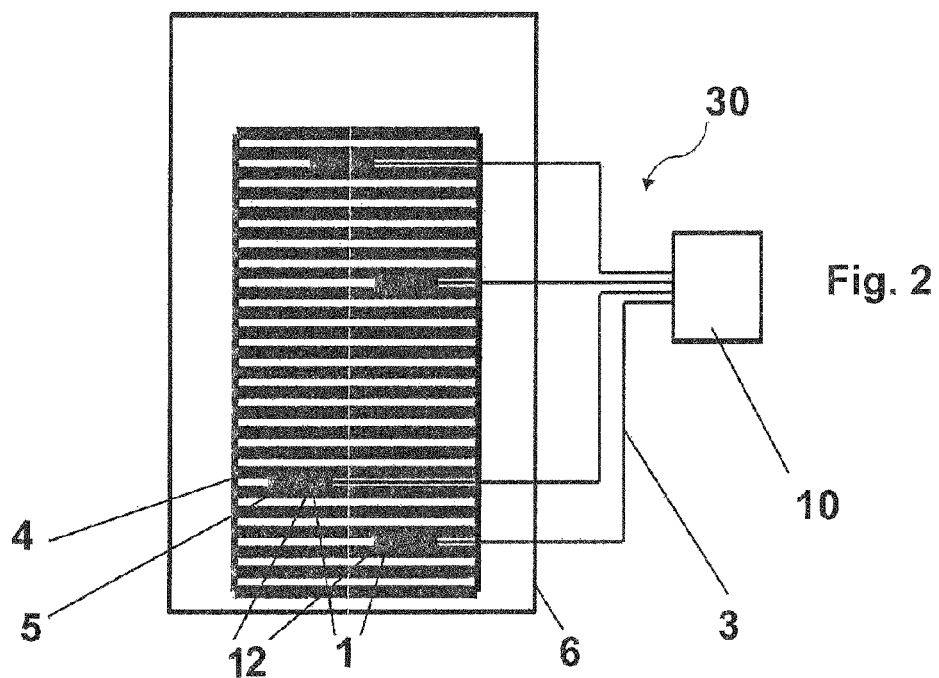
FIG. 2 shows a high-voltage transformer according to the invention with four sensors of the sensor system.
Figure 3:
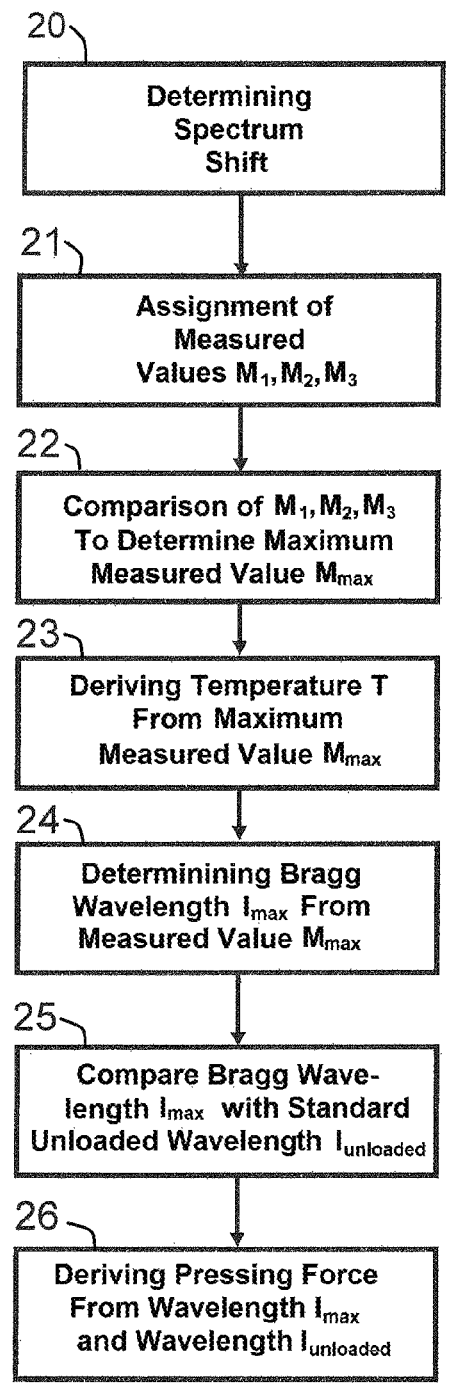
FIG. 3 is a flow chart for determining physical characteristic variables such as, for example, temperature and/or contact pressing force.

A high-voltage transformer 6 with the sensor system 30 according to the invention is depicted in FIG. 2. The sensor system 30 comprises four sensors 1 each with a respective support 12, the supports being 12 clamped in place between the windings 4 and 5. All of the sensors 1 are connected with an evaluating unit 10 by the respective optical fibers 3. A predetermined wavelength spectrum is, as well, introduced into the respective optical fibers 3. The wavelength spectrum serves for measuring the physical characteristic variables of the high-voltage transformer 6.

The sensor head 2 in FIG. 1 comprises a first Bragg grating 7 with a first characteristic Bragg wavelength $l_1$, a second Bragg grating 8 with a second characteristic Bragg wavelength $l_2$ and a third Bragg grating 9 with a third characteristic Bragg wavelength $l_3$.

These Bragg gratings 7, 8, 9 are arranged at a fixed spacing D from one another. Advantageously, in this embodiment the spacing D is 20 millimeters. However, the spacing D can be varied as desired between 5 millimeters and 100 millimeters.

During installation of the sensor 1 in the high-voltage transformer 6 it often happens that it slips and thus measures not the temperature T of two adjacent windings 4, 5, but that of the surrounding insulating oil. By virtue of the particularly advantageous positioning of the sensor 1 on the support 12 the three Bragg gratings 7, 8, 9 of the sensor head 2 are exactly between two successive windings 4 and 5. Thus at least one of the Bragg gratings 7, 8, 9 of the sensor head 2 bears against one of the windings 4, 5 and measures the actual temperature T of the winding 4 or 5.

In the measuring method for determining the physical characteristic variables such as, for example, the temperature T of two successive windings 4, 5 initially the shifts of the spectra in each Bragg grating 7, 8, 9 are determined by an evaluating device 10. In that case a first measured value $M_1$ is assigned to the first Bragg grating 7, a second measured value $M_2$ to the second Bragg grating 8 and a third measured value $M_3$ to the third Bragg grating 9. The measured values $M_1$, $M_2$, $M_3$ are subsequently compared with one another in the evaluating unit 10 so that the maximum measured value $M_{max}$, i.e. the measured value with the spectrum displaced most strongly, is assumed to be correct. Subsequently, a temperature T corresponding with the temperature of the windings 4, 5 is derived from this maximum measured value $M_{max}$ in the evaluating unit. This means that the temperature is highest at this measurement point. As soon as pressure, thus a mechanical force, acts on the sensor 1 there is a change in the Bragg wavelength $l_1$, $l_2$, $l_3$ of the respective Bragg grating 7, 8, 9. This effect is utilized by the method for determining a further physical characteristic variable, namely the contact pressing force of the windings 4 and 5 against one another. The more strongly the windings 4, 5 are pressed against one another the stronger is the change in the Bragg wavelength $l_1$, $l_2$, $l_3$ in the specific Bragg gratings 7, 8, 9. In that case, the Bragg wavelength $l_{max}$ of the previously determined maximum measured value $M_{max}$ is compared with a standard value corresponding with the unloaded Bragg wavelength $l_{unloaded}$ in an unloaded state. The pressing force of the windings 4, 5 against one another is determined therefrom. This is similarly carried out in the evaluating unit 10.

In the method according to the invention, light with a defined wavelength spectrum is radiated into the optical fiber 3 connected with a sensor head 2 of a sensor 1. For that purpose the evaluating unit 10 can also be constructed so as to introduce light into the optical fiber 3. Initially, determining the shift of the spectra in each of the Bragg gratings 7, 8, 9 of the sensor head 2 is carried out in a first step 20. Subsequently, assignment 21 of a measured value $M_1$, $M_2$, $M_3$ for each of the Bragg gratings 7, 8, 9 is carried out. The measured values $M_1$, $M_2$, $M_3$ are compared with one another in a comparison step 22 for determining the maximum measured value $M_{max}$. Finally, in step 23 a temperature T is derived from the maximum measured value $M_{max}$ on the basis of the maximum measured value $M_{max}$. The determination 24 of the Bragg wavelength $l_{max}$ of the Bragg grating of the measurement point is thus carried out in step 24 with the maximum measured value $M_{max}$. In a further comparison step 25 the Bragg wavelength $l_{max}$ is compared with a standard value corresponding with the unloaded Bragg wavelength $l_{unloaded}$. Finally, derivation 26 of the contact pressing force on the basis of the difference between the Bragg wavelength $l_{max}$ and the unloaded Bragg wavelength $l_{unloaded}$ is carried out.

The major advantage of the sensor system 30 according to the invention resides in the fact that at the outset the risk to the sensor 1 during tightening of the windings 4, 5 of the high-voltage transformer 6 is minimized. It is thereby achieved that the three Bragg gratings 7, 8, 9 of the sensor head 2 are correctly positioned between the two windings 4, 5 of the high-voltage transformer 6. At least one of the Bragg gratings 7, 8, 9 correctly and accurately detects the physical characteristic variable, namely the temperature T. A substantial contribution to secure and reliable monitoring of a high-voltage transformer 6 and thus of an energy supply mains is thereby made.

A further safety aspect is fulfilled through the additional possibility of monitoring, by the same sensor 1, the pressing force of the windings 4, 5 on one another. The manufacturer and also the operator of the high-voltage transformers 6 can check the firm seating of the windings and thus the internal state of a high-voltage transformer 6 without in that case having to open the high-voltage transformer 6.

The invention claimed is:

1. In combination with a high-voltage transformer, a sensor system for monitoring physical characteristic variables of the high-voltage transformer having windings, the sensor system comprising;
    at least one paddle-shaped sensor engaged between the windings and having an optical fiber with a sensor head carrying a plurality of Bragg gratings,
    an evaluating unit connected with the at least one sensor head by the optical fiber is associated with the sensor system, and
    a support mechanically connected with the at least one sensor and situated between two successive windings of the high-voltage transformer.

2. The sensor system according to claim 1, wherein the sensor head comprises a first Bragg grating with a first characteristic Bragg wavelength $l_1$, a second Bragg grating with a second characteristic Bragg wavelength $l_2$ and a third Bragg grating with a third characteristic Bragg wavelength $l_3$ and at least one of the Bragg gratings is in direct heat-exchange engagement with at least one of the windings.

3. The sensor system according to claim 1, wherein the at least one sensor together with the support is clamped in place between the two successive windings of the high-voltage transformer.

4. The sensor system according to claim 1, wherein the sensor system comprises four of the sensors each connected with the evaluating unit by a respective optical fiber and the four sensors are arranged at four different positions between two successive windings in the high-voltage transformer.

5. The sensor system according to claim 1, wherein a physical characteristic value is a temperature of two successive windings and/or a contact pressing force of two successive windings.

6. The sensor system according to claim 1, wherein the Bragg gratings are mounted in the sensor head at a defined spacing from one another equal to about 20 millimeters.

7. A method of monitoring physical characteristic variables of a high-voltage transformer with a sensor system, characterized by the following steps:
    radiating light with a defined wavelength spectrum into an optical fibers connected with a sensor head of a paddle-shaped sensor having a plurality of Bragg gratings each connected to a respective one of the fibers such that the light is reflected respective Brage wavelengths;
    determining a shift of the wavelength of each Bragg grating in the sensor head of the at least one sensor and assigning to it a respective measured value;
    comparing the measured values with one another and determining the maximum measured value;
    deriving a temperature of two successive windings of the high-voltage transformer from and corresponding to the maximum measured value;
    determining a Bragg wavelength $l_{max}$ of that Bragg grating with the maximum measured value;
    comparing the Bragg wavelength $l_{max}$ with a mechanically unloaded Bragg wavelength $l_{unloaded}$ that serves as a standard value; and
    deriving a contact pressure by the difference between the Bragg wavelength $l_{max}$ and the mechanically unloaded Bragg wavelength $l_{unloaded}$.

8. The method according to claim 7, wherein
    the sensor system comprises four of the sensors each connected with the evaluating unit by a respective optical fiber,
    the four sensors are arranged at four different positions between two successive windings in the high-voltage transformer and
    each sensor head comprises a first Bragg grating with a first characteristic Bragg wavelength $l_1$, a second Bragg grating with a second characteristic Bragg wavelength $l_2$ and a third Bragg grating with a third characteristic Bragg wavelength $l_3$.

9. A sensor system for monitoring physical characteristic variables of a high-voltage transformer, the sensor system comprising:
    four paddle-shaped sensors each with a respective sensor head and each carrying a plurality of Bragg gratings,
    an evaluating unit connected with each of the four sensors by a respective optical fiber, and
    a respective support mechanically connected with each sensor and mounted between different successive windings of the high-voltage transformer.

* * * * *